United States Patent
Arsenault et al.

(10) Patent No.: US 6,587,957 B1
(45) Date of Patent: Jul. 1, 2003

(54) DISK DRIVE CONTROLLER FOR CONTROLLING DATA FLOW THERETHROUGH BY SWITCHING TO SECONDARY BUS TO RECEIVE CLOCK PULSES WHEN A FAILURE ON MASTER BUS IS DETECTED

(75) Inventors: Brian Arsenault, Leicester, MA (US); Victor W. Tung, Shresbury, MA (US); Rudy M. Bauer, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/475,462

(22) Filed: Dec. 30, 1999

Related U.S. Application Data

(63) Continuation-in-part of application No. 09/365,375, filed on Jul. 30, 1999.

(51) Int. Cl.[7] .............................. G06F 1/12; H04L 1/22
(52) U.S. Cl. ...................... 713/500; 713/400; 713/502; 714/48; 326/93
(58) Field of Search ................................ 713/400, 500, 713/502, 503; 326/93, 96; 714/47, 48, 699, 707, 709

(56) References Cited

U.S. PATENT DOCUMENTS

| | | | | |
|---|---|---|---|---|
| 4,955,020 A | * | 9/1990 | Stone et al. | 370/360 |
| 4,967,344 A | * | 10/1990 | Scavezze et al. | 714/4 |
| 5,754,730 A | * | 5/1998 | Windrem et al. | 386/124 |
| 6,078,595 A | * | 6/2000 | Jones et al. | 370/503 |
| 6,141,769 A | * | 10/2000 | Petivan et al. | 714/10 |

* cited by examiner

Primary Examiner—Thomas Lee
Assistant Examiner—Thuan Du
(74) Attorney, Agent, or Firm—Daly, Crowley & Mofford, LLP

(57) ABSTRACT

A method and apparatus for controlling the flow of data through director elements of a disk drive controller are responsive to external clock signals to synchronize the internal clock timing of each director. The external clock signals are available over either a first master bus or a secondary master bus, each of the buses being connected to the director element. Each director element has circuitry which monitors the occurrence of clock pulses over the buses as well as circuitry for switching, upon the occurrence of a failure of clock pulses on the master bus, from the master bus to the secondary bus for the receipt and resynchronization of clock pulses.

9 Claims, 3 Drawing Sheets

DISK DRIVE CONTROLLER FOR CONTROLLING DATA FLOW THERETHROUGH BY SWITCHING TO SECONDARY BUS TO RECEIVE CLOCK PULSES WHEN A FAILURE ON MASTER BUS IS DETECTED

CROSS-REFERENCE TO RELATED APPLICATIONS

This application is a continuation-in-part of U.S. Ser. No. 09/365,375, entitled System Clock Configuration for Computer Storage System, filed Jul. 30, 1999, still pending, the contents of which are incorporated, herein, in their entirety, by reference.

BACKGROUND OF THE INVENTION

The invention relates generally to mass storage systems, and in particular to a synchronized clock system for use in a disk drive controller.

SUMMARY OF THE INVENTION

In a typical, modem, high speed, high capacity mass storage disk drive controller system, such as the EMC Symmetrix disk drive controller, it is common to employ a plurality of processors, each running its own code and each having its own operation within the collective whole of the controller. The controller can have, for example, sixteen or more director boards, each board having two CPUs, and passing data and other information between controller memory and either a series of disk drives or connected host computers.

Each CPU and director board could have its own time stamp, for example, for tracing the activity of the system during any board or system failure, and until recently the director boards typically kept their own time since they were all initialized at the same time. However, the commonly initiated clocks, would soon drift apart, and fail to remain synchronous. In the SYMM 4 version of the EMC Symmetrix system, there was implemented a hardware/software solution to provide a common time stamp for all of the microprocessors of the system, within, for example, one microsecond. One of the director boards became a master board which sent a clock signal out on a "clock" line or bus available to all other boards. The clock signal was used to increment, after a common initialization process, all of the CPU clock counters. If, for any reason, the clock signal was not available on the clock line, the processors/boards would switch, internally, to a local clock and would thus fall out of synchronization with each other.

When operating without the common clock, the processors, shortly after they were initially started, even if they were started at the same instant, would not remain synchronous. As a result, execution times of the same process would vary even if they were intended to start at the same time and the internal counters identifying clock time would drift so that, for example, in the event of system failure, it would generally not be possible to precisely determine the correct order of events.

In the Symmetrix SYMM 4 system, the solution of providing timing circuitry across the entire system, and the initialization thereof, was performed solely in hardware, and essentially provided a zero difference in time among the various processors. In this system, because a common clock pulse was provided to all units, the units would always clock together, even if the common clock pulses were not precisely periodic or precisely at the frequency called for. Thus, a single clock (and resynchronization) line was provided on the backplane, with clock counters at each director board incrementing on, for example, the rising edge of a common clock pulse. Further, the director boards were periodically resynchronized (using the clock line), and checks were performed to ensure that the system was within about five microseconds synchronization.

In this manner, the synchronization of this system, to provide an effective trace routine among the multiprocessors of the system, was effectively improved. However, should a fault occur so that no clock was provided on the clock line, the processors switched to their internal clocks, and the system continued to operate though without the advantage of a precise trace routine. This was not, however, detrimental to overall operation of the system but merely made troubleshooting somewhat more tedious and difficult.

Thus, if the external common clock is unavailable, for more than approximately five microseconds, a synchronization event was declared, the local counter was reset, and if the problem persisted, the processors switched to their own internal clocks. Thus, shorts, opens, a "dead master", etc. which could have resulted in a lack of a clock signal, were not a significant failure, would not take the system down, and only affected the trace program.

Nevertheless, in the process of improving the disk controller, it became clear that the microcode of each director board began to use and rely upon the clock signal and the resulting counter clock time for scheduling. As a result, the failure to provide the external, common clock signal, and to lose synchronization, now could have a substantial deleterious effect on operation of the system. As a result, in the SYMM 4 version of the EMC system, when the hardware detected a missing or "dead" clock on the common clock line, it would generate a high level interrupt to the processor. If the microprocessor based code confirmed that the clock was missing or "dead", it then declared a synchronization event, switched to its internal clock, and modified the scheduling of the scheduled events as appropriate.

The invention advantageously provides a method and apparatus for improving the use of clock synchronization in a multiprocessing disk controller system in which clock time across a plurality of units becomes important. Other advantages of the system are a more reliable operating system and platform, more reliable trace scheduling and hence better tracing during a failure mode, and the ability of the microcode to rely upon the clock for scheduling and other activities.

SUMMARY OF THE INVENTION

The invention relates to a disk drive controller having a plurality of director elements. Each director element is able to control the flow of data therethrough and is responsive to external clock signals to synchronize its internal clock timing. The disk drive controller features a first master bus and a secondary master bus, each bus being connected to each director element, and each director element having circuitry for monitoring the occurrence of clock pulses over the buses and circuitry for switching from the master bus to the secondary bus for the receipt of clock pulses upon the occurrence of a failure of clock pulses over the master bus.

In particular embodiments of the invention, each director has a counter responsive to each received clock pulse for incrementing its count, a switch for selecting from which bus to receive the clock pulses, a hardware circuitry for identifying a first low threshold failure of clock pulses on the first master bus and for effecting a synchronization event in response thereto wherein the counter is reset, and a microcoded processor for deciding whether to cause the switch to the secondary bus for receiving clock pulses.

The method of the invention relates to controlling the flow of data through director elements of a disk drive controller, and being responsive to external clock signals to synchronize the internal clock timing of the director elements. The method features providing a first and a second master bus, connecting each bus to each director element, monitoring at each director element the occurrence of clock pulses over the buses, and switching from a first master bus to a second master bus for receipt of clock pulses upon the occurrence of a failure of clock pulses over the master bus.

The method further features determining, by consensus of the directors, whether a clock failure has occurred on a particular bus. The method also features employing the clock synchronizing signals over the master bus for internal operations.

Accordingly, the invention advantageously provides for failure of a first external clock generating mechanism so that a plurality of directors can remain in synchronism even if there is a failure of clock pulses over a first bus. The invention also advantageously enables the director elements to schedule operations in accordance with a master clock time related to the clock times of all other directors in the system.

BRIEF DESCRIPTION OF THE DRAWINGS

Other features and advantageous of the invention will be apparent from the following description taken together with the drawings in which.

DESCRIPTION OF A PREFERRED PARTICULAR EMBODIMENT

Figure 1:
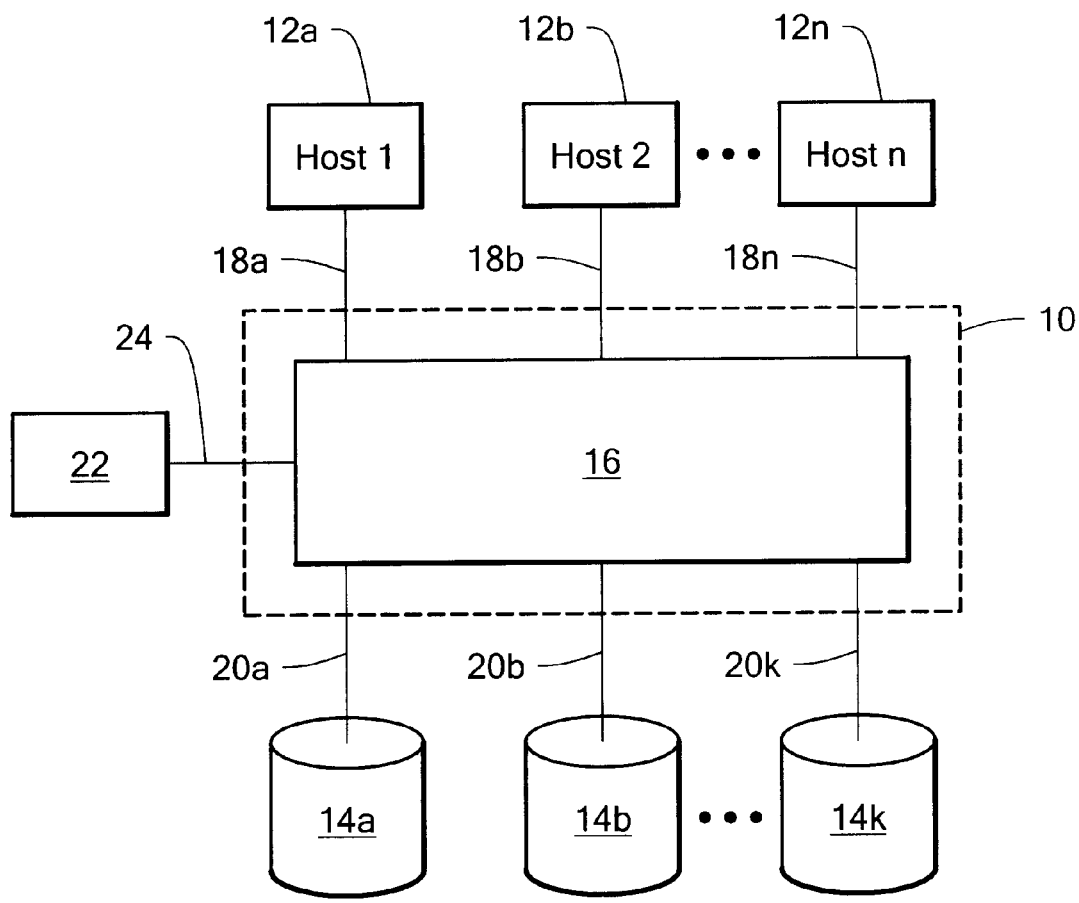
FIG. 1 is a schematic block diagram of a system in which the invention is useful.

Referring to FIG. 1, the invention is used in a mass storage system 10. The storage system connects to a plurality of host computers 12a, 12b, . . . , 12n. The mass storage system 10 has a plurality of physical disk drive elements 14a, 14b, . . . , 14k. Interconnecting the host computers 12 and the disk drive elements 14 is a disk drive controller 16, for example, that made by EMC and known as the Symmetrix7 controller. The disk drive controller 16 receives memory commands from the various host computers over buses 18a, 18b, . . . , 18n, respectively, for example, connected and operating in accordance with a SCSI protocol, and delivers the data associated with those commands to the appropriate disk drive elements 14 over respective connecting buses 20a, 20b, . . . 20k. Buses 20 also preferably operate in accordance with a SCSI protocol.

Each of the disk drive elements 14 typically has in excess of one gigabit of memory and is logically divided, in accordance with known techniques, into a plurality of logical volumes. In a typical configuration, the controller system also connects to a console PC 22 through a connecting bus 24. Console PC 22 is used for maintenance of and access to the controller and can be employed to set parameters of the controller as is well known in the art.

Figure 2:
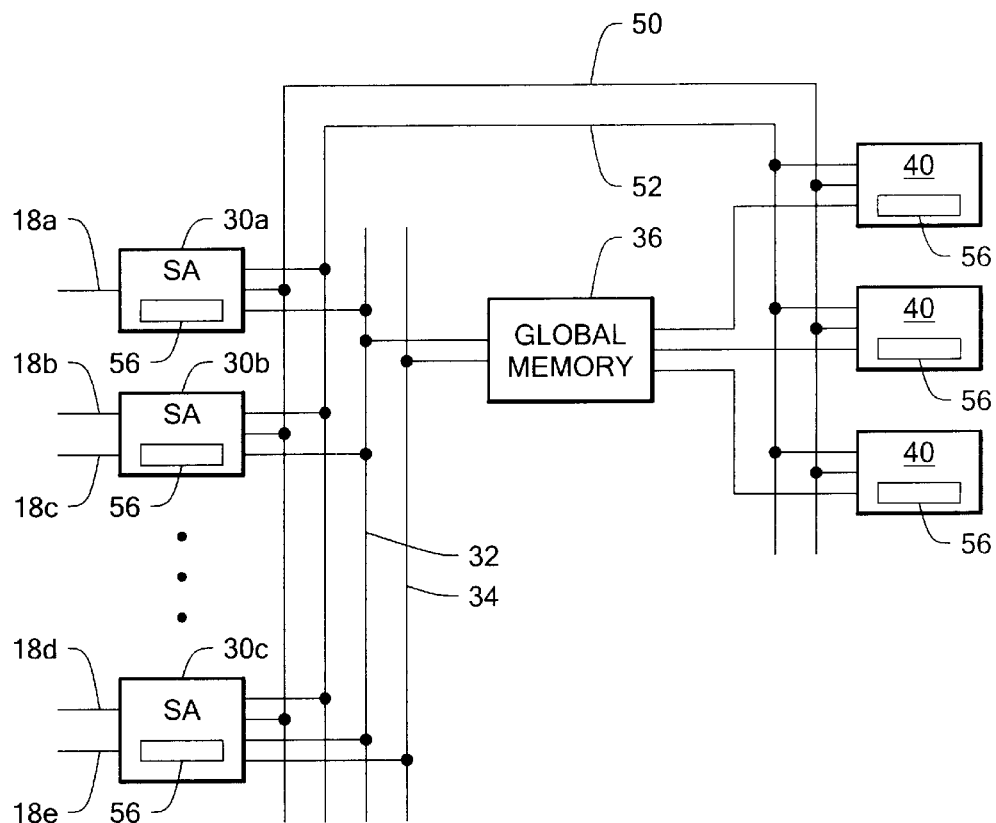
FIG. 2 is a more detailed schematic block diagram of a disk drive system in accordance with the invention.

Referring to FIG. 2, within the disk controller 16 to which the invention is particularly useful, each host computer connects to a channel director 30 (also referred to as a SCSI adapter) over the SCSI bus lines 18. Each channel director, in turn, connects over one or more system buses 32 or 34 to a global memory 36. The global memory preferably includes a large cache memory through which the channel directors can communicate with disk directors 40, which in turn, control the disk drives 14.

Each of the directors, whether it is a channel director 30 or a disk director 40, connects to each of a pair of clock lines 50, 52 over which clock pulses and synchronization event commands, as noted above, can be sent. By agreement, on startup, one of the clock lines, for example, clock line 50, is selected as the primary clock line and one of the directors, for example, the director found in slot zero in the storage rack into which the director boards are fit, for example director 30a, is designated as the master clock for line 50. A second source, for example director 30b, is selected as the secondary or back-up clock source for the second clock line 52. Thus, by predesignation, a master director driver and a master clock line are designated among the microcode controlled processors of all of the directors. The microcoded processors also agree upon a message protocol as is described in more detail below.

In general broad description, if a synchronization event occurs, that is, if a director identifies the failure of the master clock pulses, then after there is agreement among all of the directors, or at least substantially all of the directors that a fault has occurred, the directors will resynchronize their clocks at the same instant and turn to the clock signal on secondary clock line 52 as the source of synchronous clocking. This can occur, preferably, automatically, or can occur as a result of a manual switch.

Figure 3:
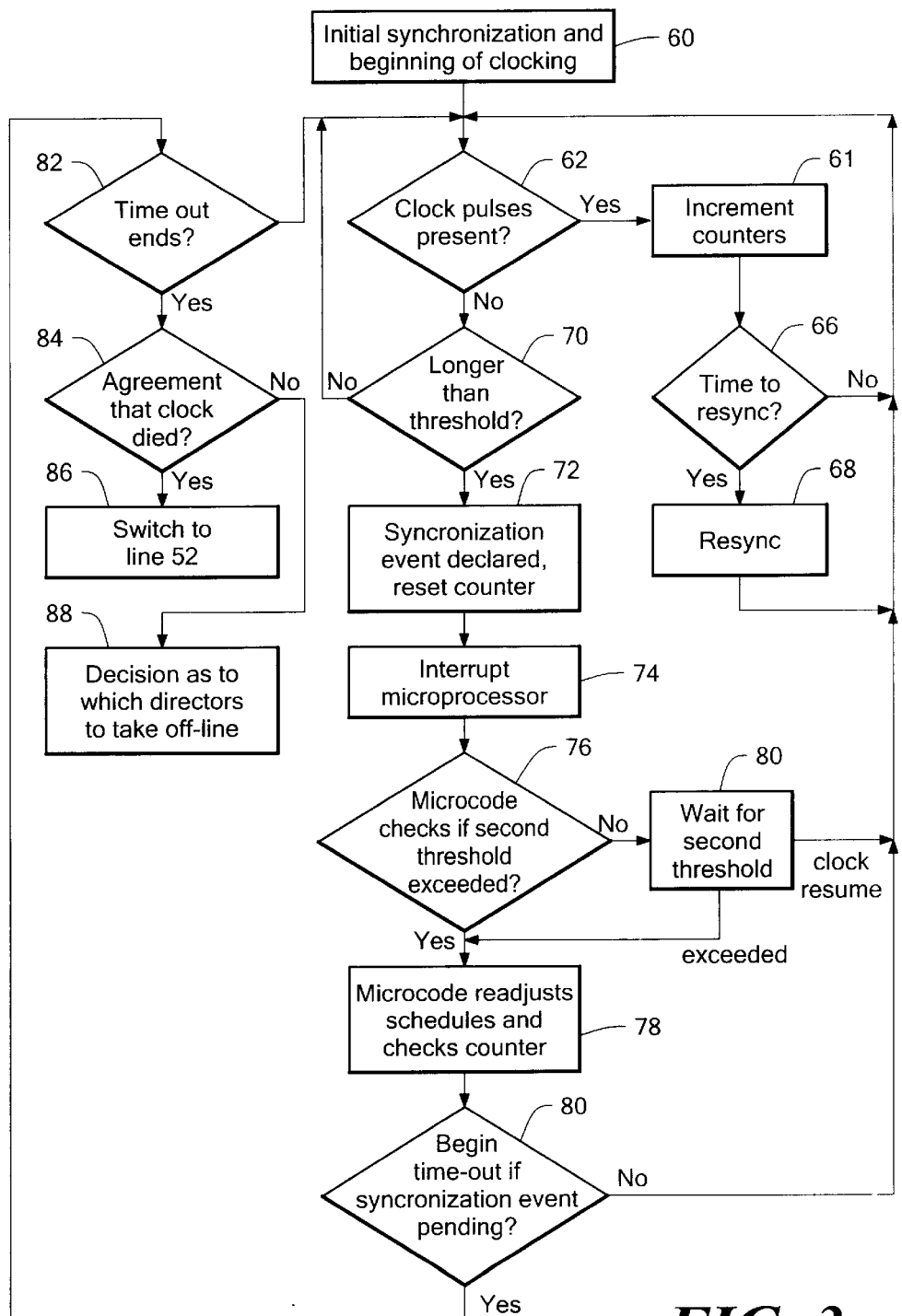
FIG. 3 is a flow chart illustrating operation in accordance with a preferred embodiment of the invention.

Referring to FIG. 3, in operation, the directors synchronize their clocks on startup by resetting their internal counters 56 after which time the master director 30a (it is operating) begins to send clock pulses over the master line 50. This is indicated at 60. Each director then checks at 62 for a continuing flow of clock pulses over line 50. So long as clock pulses continue to be found at intervals no greater than some threshold value, for example, five microseconds, (where the nominal period between clock pulses might be one microsecond), the directors operate in a normal fashion and increment an internal counter at each clock signal. Typically, for example, the internal counter can be incremented on the rising edge of each clock pulse. This is indicated at 64.

The counter for example, a thirty-two bit counter, is then checked at 66 to determine whether it is time for a resynchronization event to occur whereby all of the counters are resynchronized at a zero count. This can occur, for example, every 30 minutes. If it is time to resynchronize, the counters are reset by the microcode. The test for resynchronizing is shown at 66 and the resynchronization step itself is indicated at 68. After resynchronization, or if resynchronization is not yet required, the system loops back to 62 to continue checking for a continuous stream of clock pulses.

If the clock pulse stream is interrupted, as detected by a director in the system, and if the interruption is longer than a selected threshold value, for example five microseconds, as tested at 70, then a synchronization event is declared and the director counter is reset, typically to zero. This is indicated at 72. This occurs at each director independently. In addition, a high priority interrupt is sent to the microprocessor. At this time, the handling of the interrupt is the responsibility of the microprocessor. This is indicated at 74.

At this stage of operation, the master microprocessor executes a synchronization event command. That is, if the clock is down longer than a second threshold time, for example, eight microseconds, the microcode will check and recognize whether the synchronization event has occurred, and may read, and reread, its counter to check that it is low (indicating the synchronization event has occurred). The microprocessor can then readjust its schedules if necessary. This is indicated at 76, 78. If the second threshold is not exceeded within a reasonable time, then the system loops back to checking for clock pulses since the clock signals have then resumed. This is indicated at 80.

If a synchronization event has occurred and is still pending, a timeout of between, for example, 10 and 500 microseconds is set. If the synchronization event does not clear by the end of the timeout, the event is logged, and a message is sent to all other directors. This is indicated at 80. If the synchronization event is not pending, the system continues to review and look for the clock pulses. If the timeout ends at 82, and the pulses have again begun to appear, the system loops back to the decision box at 62 to check for continuing pulses. If, on the other hand, the timeout ends without the further appearance of clock pulses, and there is agreement among the processors that the clock pulses on line 50 have died, as indicated at 84, then the directors all switch and resynchronize to the clock pulses appearing on line 52. If there is no agreement that the clock has died, then the director(s), which consider the clock to have died, take themselves offline provided a majority of the directors agree that the clock signals are continuing to occur. This decision process is indicated at 88.

In this manner, redundancy is built into the system so that at worse, the failure of the clock pulse to appear, periodically, on the master clock line has little to no effect on the operation of the system, including the microcode. The result may be a "pause" in operation but that pause will not have any lasting detrimental effect. Once the fault is determined, it can be repaired in accordance with standard practices.

Additions, subtractions, and other modifications of the invention will occur to those who are practiced in this field and are within the scope of the following claims.

What is claimed is:

1. A disk drive controller having a plurality of directors, each one of the directors able to control the flow of data therethrough and being responsive to external clock signals to synchronize its internal clock timing comprising:
    a master bus and a secondary bus, each said bus being connected to each said director; and
    each said director having:
        circuitry for monitoring the occurrence of clock pulses over said buses;
        a counter responsive to each received clock pulse for incrementing its count;
        a hardware circuitry, coupled to the monitoring circuitry and to the counter, for identifying a first low threshold failure of clock pulses on the master bus and for effecting a synchronization event in response thereto wherein the counter is reset;
        a macrocode processor, coupled to the hardware circuitry, for deciding whether to cause said director to switch to the secondary bus for receiving clock pulses; and
        switching circuitry, coupled to the macrocode processor, for switching said director from the master bus to the secondary bus for the receipt of clock pulses upon the occurrence of a failure of clock pulses over said master bus.

2. The disk drive controller of claim 1 wherein each director further comprises:
    said macrocode processor setting a timeout period for causing the switching whereby the switching is effected if clock pulses fail to appear after said timeout period, and said plurality of directors are in agreement that a clock failure occurred on the master bus.

3. The disk controller of claim 2 wherein said timeout period is between 10 and 500 microseconds.

4. The disk drive controller of claim 1 wherein the first threshold is greater than about five clock cycles.

5. A method for controlling the flow of data through directors of a disk drive controller, the directors being responsive to external clock signals to synchronize the internal clock timing of the directors comprising:
    connecting a master bus and a secondary bus to each director;
    monitoring the occurrence of clock pulses over the buses;
    incrementing, at each director, a counter responsive to each received clock pulse from the buses;
    selecting from which bus to receive clock pulse;
    identifying a first low threshold failure of clock pulses on the master bus;
    effecting a synchronization event in response to the threshold failure wherein the counter is reset;
    deciding, at each director, whether to cause the director to switch to the secondary bus for receiving clock pulses; and
    switching from the master bus to the secondary bus for the receipt of clock pulses by the directors upon the occurrence of a failure of clock pulses over the master bus.

6. The method of claim 5 further comprising setting a timeout period for causing the switching between said buses; and
    effecting the switching if the clock pulses fail to appear after the timeout period and the plurality of directors are in agreement that a clock failure has occurred on the master bus.

7. The method of claim 6 wherein said timeout period is between 10 and 500 microseconds.

8. The method of claim 5 Wherein the first threshold is greater than about 5 clock cycles in duration.

9. A disk drive controller for interconnecting a host computer to a plurality of disk drives, such controller comprising:
    a global memory;
    a plurality of directors each one being coupled to the global memory, each one of the directors having: an internal clock; a counter; and a microprocessor;
    a pair of clock lines, each one of the plurality of directors being coupled to the pair of clock lines, one of such pair of clock lines being initially designated as a primary clock line and the other being a secondary clock line, one of the plurality of directors being initially designated as a source for producing clock pulses on the primary clock line for the plurality of directors;
    wherein directors increment the internal counter thereof for counting the clock pulses on the primary clock line, and wherein the microprocessor therein determines whether the count has reached a predetermined value after a predetermined period of time, and if not, a synchronization event is declared; and
    wherein, in response to the declared synchronization event and upon agreement among the plurality of directors, a different one of the directors is selected to produce clock pulses for the plurality of directors on the secondary clock line.

* * * * *